Patented Dec. 6, 1938

2,139,231

UNITED STATES PATENT OFFICE 2,139,231

COMPOSITION FOR TREATING LEATHER, LACQUERED SURFACES, AND OTHER MATERIALS

Winfrid Hentrich, Dusseldorf-Reisholz, and Carl Albert Lainaü, Dusseldorf, Germany, assignors to Henkel & Cie. G. m. b. H., Dusseldorf-Holthausen, Germany, a corporation of Germany No Drawing. Application February 19, 1936, Serial No. 64,654. In Germany February 21, 1935

1 Claim. (Cl. 134—24)

This invention relates to compositions for use in the treatment of wood, lacquer finishes, leather, metals to be etched and other substances for the purpose of preserving, protecting or polishing the same. More particularly, it relates to compositions of the nature of floor waxes, shoe creams and polishing agents of various kinds, which contain a novel component or components serving as a wax substitute, a solvent or a blending agent or other purpose, as hereinafter disclosed. The invention is also concerned with the preparation of these novel components.

Broadly considered, the invention involves compositions of the above mentioned nature which contain as one or more of their constituents carboxylic acid esters of hydrogenation products of compounds containing at least two hydroxy-aromatic radicals, or such hydrogenated hydroxy-aromatic compounds themselves.

Among the objects of the present invention is the provision of preserving compositions at a lower price than heretofore possible with other wax-like substances and solvents, and, also, the provision of such products having superior properties to those heretofore produced and sold in the market.

The esters of the herein described poly hydroxy-hydroaromatic compounds formed by the use of higher molecular carboxylic acids containing from about 12 to 22 or more carbon atoms possess wax-like properties and are capable of either wholly or partially displacing waxes in the preserving compositions now on the market. The lower molecular carboxylic acid esters of the said hydroxy hydroaromatic compounds may be substituted for the usual solvents heretofore employed in the preparation of surface preserving compounds or may be employed for assisting in the blending of other components or for obtaining the particular consistency or mechanical property in the compositions.

As will be more clearly brought out, the poly hydroxy-hydroaromatic compounds themselves are suitable for either wholly or partially displacing the resins which have previously been used in polishing or other surface preservatives.

In accordance with one embodiment of the present invention the hydrogenated hydroxy-aromatic groups are directly joined together by a carbon to carbon bond. The simplest example of compounds covered by this embodiment may be represented by the formula HO.R.R′.OH, in which R and R′ indicate wholly or partially hydrogenated aromatic hydrocarbon radicals directly joined together. Either or both of the aromatic groups may be substituted by additional hydroxy groups. Especially good results have been obtained by the use of compounds in which the hydroxyl groups are attached in a para position with reference to the carbon to carbon linkage. A specific example of a wholly or partially hydrogenated diaryl compound containing two hydroxyl radicals is saturated or perhydrogenated 4,4′ dihydroxy diphenyl of the formula:

In accordance with another embodiment of the invention the rings of the two or more hydroxy hydroaromatic radicals may be joined together by a carbon bridge or linkage having from one to about 20 carbon atoms. The simplest member of this class comprises diaryl methanes, or aryl radicals joined by a methylene group, which contain a hydroxyl group or groups upon each of the aryl radicals. Perhydrogenated dihydroxyl diaryl methanes have given very good results, the simplest example of this class of compounds being perhydrogenated dihydroxy diphenyl methane of the formula:

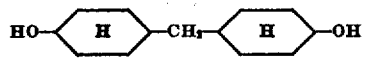

In accordance with another embodiment of the invention there may also be used those compounds which contain more than two hydroxy hydroaromatic groups, which groups may be joined either directly or through alkylene groups. An example of this type of compound is perhydrogenated 2,6-bis-(2′ hydroxy-5′ methyl-benzyl) 4-methyl phenol of the formula:

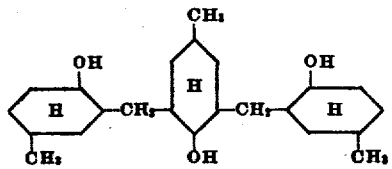

Another example in this embodiment includes diphenyl derivatives which may possess a molecular structure illustrated by the following formula:

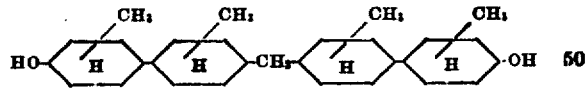

The hydrocarbon groups which join the hydroxy hydroaromatic radicals may be of quite a varied nature for they may be straight chain or branched chain and short or long, according to the particular properties desired. As examples of unbranched chains there may be mentioned —CH₂—CH₂— or —CH₂—CH₂—CH₂—. As examples of suitable branched chains the following are illustrative:

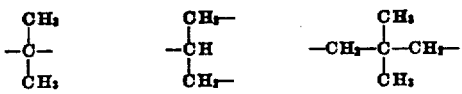

Examples of hydroxy hydroaromatic compounds of the present invention are as follows:

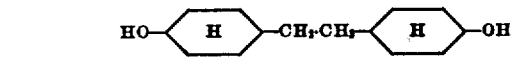

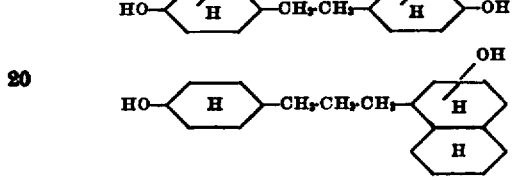

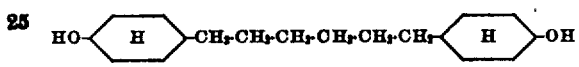

In substantially all of the examples hereinbefore mentioned, the aromatic compounds have been derivatives of benzene, but the invention is not limited thereto for it extends to similar compounds containing hydroxy hydrogenated naphthalene, anthracene and phenanthrene rings, the last mentioned being those such as derived from colophony alcohols. The aromatic compounds may possess any combination of the mono and the poly nuclear aromatic rings, in accordance with the broader concepts of the invention. As an example of a derivative of naphthalene which may be used in accordance with the present invention, there may be mentioned perhydrogenated 2,2'-dihydroxy-1,1'-dinaphthyl methane of the formula:

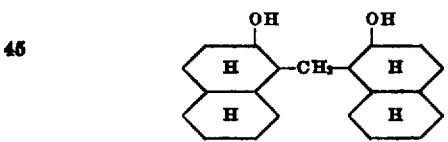

As an example of a mixed aromatic compound, there may be mentioned the perhydrogenated 4-parahydroxy phenyl-alpha-naphthol of the formula:

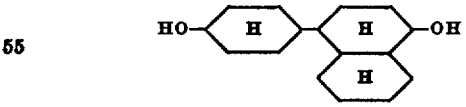

In the foregoing formula as well as in all of the other examples hereinbefore given, the relationship of the two hydroxy radicals need not be in a para position, for the para compound may be displaced by ortho compounds or mixtures of ortho and para compounds.

In another embodiment, the present invention extends to substitution products of any and all of the hydrogenated hydroxy aromatic compounds hereinbefore disclosed, and particularly to those substituted products having an aliphatic group or groups containing from about 1 to 20 carbon atoms. The suitable lower molecular alkyl groups include methyl, ethyl, propyl, isopropyl, butyl and isobutyl radicals. As higher molecular alkyl groups there may be mentioned octyl, decyl, dodecyl, tetradecyl and hexadecyl radicals. Hydroxy hydroaromatic compounds substituted by aryl radicals or by cycloaliphatic radicals may also be employed.

As examples of substituted compounds, there may be mentioned hydrogenated hydroxyphenyl cresols, hydrogenated hydroxyphenyl xylenols and hydrogenated hydroxy naphthyl cresols. Such products may be used by themselves or in admixture with one another, or in admixture with various isomers of said substances.

As examples of a substituted hydrogenated dihydroxy diaryl compound joined through a hydrocarbon chain there may be mentioned perhydrogenated dihydroxy ditolyl methane and a compound represented by the following formula:

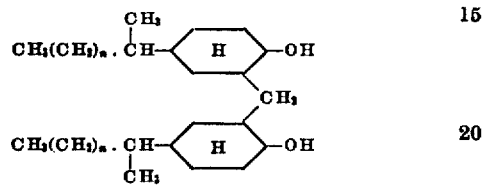

wherein $n$ may be from about 5 to 15. In this formula, the substitution radicals may alternatively be methyl groups.

In preparing the hydrogenated hydroxy-aromatic compounds and their esters, of the present invention, several processes are contemplated and are within the scope of the present invention. Generally the raw material used will consist of simple hydroxy-aromatic compounds such as phenol, toluol and like compounds. In producing compounds containing at least two hydroxy-aromatic radicals several methods are contemplated.

According to one method benzidine is diazotized at both NH₂ groups by treatment with sodium nitrite and sulfuric acid, the resulting tetrazo compound being then converted into 4,4'-dihydroxy-diphenyl by the introduction of water. In an analogous manner, one may also obtain the cresol and naphthol derivatives.

In accordance with a second method, the dihydroxy diaryl methanes may be produced by the condensation of aldehydes or of ketones with aromatic hydroxy compounds. For example, formaldehyde may be condensed with an aromatic hydroxy compound through the aid of hydrochloric acid, sulfuric acid or perchloric acid. In the same manner higher molecular aldehydes and ketones may be condensed with aromatic hydroxy compounds, examples of such aldehydes and ketones being dodecyl aldehyde, stearyl aldehyde, undecyl methyl ketone, methyl nonyl ketone and the like. The reaction apparently proceeds in the following manner:

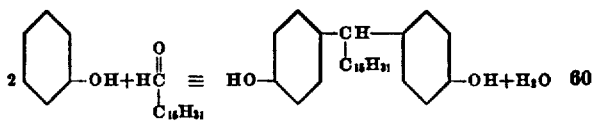

Diphenyl methane derivatives possessing long alkyl groups such as have been disclosed herein may be obtained, for example, by first condensing cresol with olefines and then condensing the resulting alkyl cresols with formaldehyde in molecular quantities according to the ratio of 2:1, said reaction being carried out in the presence of dilute sulfuric acid and the formaldehyde being technical formalin.

Poly aromatic compounds containing two diphenyl radicals may be obtained, for example, by condensing perhydrogenated dioxy-ditolyl methane with two moles of cresol in the presence of a 60% solution of perchloric acid at a temperature of 80-100° C. Through this reaction, products of the following constitution may be obtained:

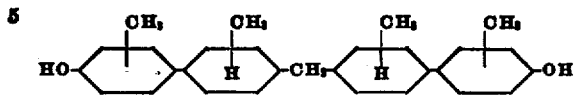

The present invention is not limited to the above described methods of producing aromatic hydroxy compounds but it extends to other processes described in the literature and in prior patents.

The next step in the production of the components of the polishes and other compounds of the present invention involves hydrogenation. The above disclosed aromatic compounds are subjected to an elevated temperature and high pressure hydrogenation in accordance with known procedure wherein catalysts such as nickel, copper, cobalt, chromium, the noble metals or mixtures of these metals, are employed, or, alternatively, catalysts that are not poisoned by sulfur such as molybdenum and tungsten-containing catalysts and other like compounds. The hydrogenation may be conducted in such manner as to either wholly or partially convert the aromatic groups into hydroaromatic groups, the hydroxyl groups being retained.

Since the hydrogenation procedure is capable of simultaneously reducing carbonyl groups, the present invention extends to the treatment of aromatic compounds containing carbonyl groups which upon reduction will lead to hydrogenated dihydroxy diaryl alkanes or similar aromatic compounds linked by means of normal or branched chain hydrocarbon radicals. For example, dihydroxy diaryl diketones may be subjected to the hydrogenation or reduction treatment and as a result the CO groups are reduced to CH₂ groups without disturbing the OH radicals. The diketones themselves may be obtained, for example, by converting adipinic acid-meta-cresol ester to the diketone by heating the same in the presence of aluminum chloride. The following formula illustrates the compound produced in the reaction:

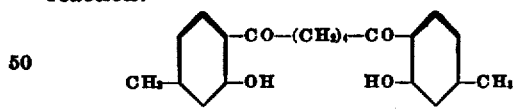

This compound upon reduction produces a dihydroxy compound of the following structure:

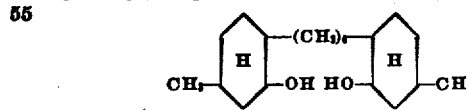

Through this same reaction there can be obtained compounds having more than two hydroxyl groups.

In accordance with a most valuable embodiment of the present invention, compounds are treated which contain more than two aromatic rings. These products may be secured, for example, by the hydrogenation of the so-called novolaks which are condensation products obtained by heating phenol with formaldehyde in the presence of weak alkaline or acidic agents. The hydrogenated novolaks which may be easily produced possess the characteristic structure of hydrogenated poly aromatic compounds described herein and are therefore within the broad scope of the present invention.

The hereinbefore described hydroaromatic compounds containing at least two hydroxyl groups can be produced as water-white, glassy solidified bodies. They are soluble in ether, acetone, methyl alcohol, ethyl alcohol, partially blown linseed oil and in aromatic and hydroaromatic hydrocarbons. As hereinbefore stated, they are excellently adapted for use in place of resins in various preservative compositions such as in polishes.

In producing the esters of the hydroxy hydroaromatic compounds hereindescribed, carboxylic acids of the most varied types may be employed. Esters of the following acids have been found to possess satisfactory properties, formic acid, acetic acid, propionic acid, butyric acid, acrylic acid, lactic acid, caproic acid, lauric acid, stearic acid, palmitic acid, oleic acid, behenic acid, montanic acid, erucic acid, wax acids, ricinoleic acid, abietic acid, naphthenic acid, benzoic acid, salicylic acid, anthranilic acid or mixtures of such acids. Instead of employing esters of simple carboxylic acids, esters of substituted carboxylic acids may be employed, such as, for example, the esters of chloracetic acid, methoxy acetic acid, phenyl-mercapto acetic acid, cresoxy acetic acid, hydroxyethoxy acetic acid, cyclohexyl oxyacetic acids and the like. Furthermore, esters of homologues and analogues of these same acids may be used and also esters of such compounds as alpha-phenoxy stearic acid, alpha-methyl mercapto propionic acid, dodecahydro-benzyl cresoxy-acetic acid and other like compounds. The mono esters, and as well, the diesters may be employed in compositions together with a portion of the un-esterified polyhydroxy hydroaromatic compounds. When poly hydroxy compounds are used containing three or more hydroxyl groups, it is permissible to either partially or wholly esterify these hydroxyl groups.

In accordance with the present process, the polyhydroxy hydroaromatic compounds are esterified with the carboxylic acids of the above described nature in known manner. For accomplishing this result, it is generally preferable to mix these compounds in theoretical proportions and heat them until the desired esterification is completed. When it is desirable to produce mixtures of mono or diesters, an excess of either one or the other of the components is used. In this manner valuable products are obtained when higher molecular fatty acids are heated with the hydrogenated hydroxy compounds in the molecular proportions of 1.5 to 1 to 2.5 to 1. By altering the proportions, the properties of the obtained products can be changed gradually, depending upon the particular components which have been used. The properties alterable by this procedure include the melting temperature, the softening points and the structure, that is, a more resinous or a more crystalline structure.

The esterification reaction may be carried out in a partial vacuum, for example, at 12 mm. and in this manner discoloration of the product is prevented. During the course of the esterification, the passage of inert gases such as nitrogen through the apparatus frequently leads to better results. The duration of the heating operation is dependent upon the temperatures employed. As an example of this procedure, hardened rapeseed oil acids are esterified with perhydrogenated dihydroxy ditolyl methane by heating for a period of 24 hours at a temperature between about 160-200° C. Esterification is sometimes benefited by carrying out the reaction in the presence of solvents, azeotropes or accelerators such as water binding or absorbing agents. The present invention is not limited to this particular type of esterification reaction for other known methods are disclosed in the literature and in prior patent specifications.

The esters obtained in the foregoing manner are very soluble in organic solvents, for example, the esters of the higher molecular fatty acids are soluble in higher boiling mineral oils, in aliphatic and aromatic hydrocarbons and also in ethers and in acetone.

The surface preserving compositions of the present invention are compounded in known manner with the hereinbefore described polyhydroxy poly hydroaromatic compounds and their esters. These compounds may displace other like compounds in the compositions or may be included as an additional component substituted wholly or in part for the waxes, resins or softening materials or other components of such compositions. Since the properties of the esters and of the poly hydroxy compounds may be varied within wide limits, compositions may be produced having special properties rendering them suitable for specific purposes. The present products are in many cases superior in several respects to the compounds previously used for the same purpose, including the quality that they may be obtained in light colors which do not become darker upon storage or use. Surface preserving compositions prepared with the above mentioned esters have a very good luster. Furthermore, they are especially valuable as a floor polish, for the resulting surface is not of a slick nature which frequently leads to skidding, slipping of rugs, etc.

*Example 1*

Sixty parts by weight of a solid ester obtained by the reaction of the higher boiling portion of hardened rapeseed oil acids essentially behenic acid, with perhydrogenated 4, 4'-dihydroxy-diphenyl-methane is combined with 6 parts by weight of ozocerite, 4 parts by weight of paraffin having a melting point within the range of about 50–52° C., and 30 parts by weight of mineral oil. The resulting composition constitutes a very good floor polishing agent of waxy character. The preparation of the said esters may be effected by mixing the specified derivative of diphenyl methane with the said fatty acids in proportions of 1 to 2, or in the smaller proportion of 1 to 1.75, and heating the mixture in a vacuum of 12 mm. for a period of 24 hours at a temperature of about 180–200° C.

The hydrogenated diphenyl methane compound itself may be produced by introducing dihydroxy diphenyl methane into a stirring autoclave with the addition of 10% by weight of a nickel-containing mixed catalyst and then heating to about 200° C. and introducing hydrogen under a pressure of about 100 to 150 atmospheres until 6 moles of the hydrogen to each mole of the aromatic compound have been absorbed.

Instead of the specified compound which contains a hydrogenated benzol ring, there may be used the corresponding compounds which contain hydrogenated naphthalene, anthracene or phenanthrene rings. In place of the perhydrogenated dihydroxy compounds, the corresponding partially hydrogenated dihydroxy compounds may be employed in the esterification with the higher molecular fatty acids with results which lead to surface preserving compositions of good quality.

*Example 2*

Forty parts by weight of the ester prepared with the aid of heat under a partial vacuum from hardened whale oil fatty acids and a hydrogenated product of the reaction of a commercial mixture of orthocresols with formaldehyde as hereinbefore described, is combined with 3 parts by weight of ozocerite, 2 parts by weight of bleached montan wax and 55 parts by weight of mineral oil. The resulting product is excellently adapted for use as a polishing wax.

*Example 3*

Hydrogenated novolak compounds are esterified with hardened whale oil fatty acids. The hydrogenated novolaks are obtained by condensing 7 moles of phenol with 6 moles of formaldehyde in known manner until a resinous product is obtained and treating 227 parts by weight of this product with hydrogen at a pressure of 100 atmospheres in the presence of 30 parts by weight of a nickel-containing mixed catalyst in a stirring autoclave for a period of 4 hours at a temperature of 190 to 230° C. Forty parts by weight of the hydrogenated novolak esters are made into a homogeneous mass with 3 parts by weight of ozocerite, 2 parts by weight of bleached Montan wax and 55 parts by weight of mineral oil. A polishing wax of good quality is obtained in this manner. It should be understood that the preparation of suitable novolaks may be accomplished by using other proportions of phenol and formaldehyde than those disclosed.

*Example 4*

Fifty parts by weight of esters prepared in accordance with the process of Example 2 or 3 are combined with 10 parts by weight of paraffin having a melting point of about 50–52° C., 2 parts by weight of ozocerite, 8 parts by weight of crude Montan wax, 3 parts by weight of nigrosin and 27 parts by weight of oil of turpentine. The resulting product comprises a shoe cream of good polishing qualities. Instead of employing hardened whale oil fatty acids, other higher molecular fatty acids containing at least 12 carbon atoms, such as have been hereinbefore disclosed, may be employed.

*Example 5*

Acetone is condensed with cresol, having an acid number of 25, in conventional manner and is next hydrogenated and then esterified with montanic acid. Thirty parts by weight of the resulting ester are thoroughly mixed to form a stable emulsion with 10 parts by weight of mineral oil, 7 parts by weight of oil of turpentine, 50 parts by weight of water and one part by weight of potassium oxide. The resulting product may be used as an emulsified polishing wax with good results.

*Example 6*

Hardened rapeseed oil fatty acids are esterified with perhydrogenated 4,4'-dihydroxy-ditolyl methane of the formula—

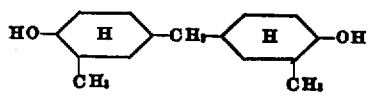

Fifty parts by weight of the resulting ester are dissolved in 50 parts by weight of mineral oil. The resulting product comprises a good polishing agent for treating and preserving floor finishes and also for polishing lacquered surfaces. The surfaces treated in this manner possess a high gloss, are impervious to water and have non-skidding characteristics. The ratios of the components of this composition may be varied within considerable limits. In place of the compound represented by the above formula, there may be used compounds which are substituted by higher molecular alkyl groups instead of by the methyl groups, which higher alkyl groups may possess up to about 20 carbon atoms.

Example 7

Cyclohexanone is condensed with technical cresol in known manner and then hydrogenated, the resulting product being then esterified with a higher boiling portion of hardened whale oil fatty acids. Fifteen parts by weight of the ester obtained are thoroughly mixed with 7 parts by weight of ozocerite, 13 parts by weight of paraffin and 65 parts by weight of oil of turpentine. The resulting product possesses good polishing qualities and gives a very high gloss to surfaces to which the same is applied. It is of special value for the preservation of leather and may be used in the treatment of French polish, etched metals and other substances.

It should be understood that the present invention is not limited to the specific compounds and process steps hereinbefore disclosed, but that it includes all variations coming within the tenor of the specification and the scope of the terms of the appended claim.

We claim:

Polishing compositions of waxy character containing as the primary waxy component a monobasic carboxylic acid ester of a perhydrogenated novolak.

WINFRID HENTRICH.
CARL ALBERT LAINAU.

---

CERTIFICATE OF CORRECTION.

Patent No. 2,139,231.   December 6, 1938.

WINFRID HENTRICH, ET AL.

It is hereby certified that error appears in the printed specification of the above numbered patent requiring correction as follows: Page 3, first column, line 59, for "CH" at the end of the formula read $CH_3$; and that the said Letters Patent should be read with this correction therein that the same may conform to the record of the case in the Patent Office.

Signed and sealed this 14th day of February, A.D. 1939.

Henry Van Arsdale.

(Seal)   Acting Commissioner of Patents.

gloss, are impervious to water and have non-skidding characteristics. The ratios of the components of this composition may be varied within considerable limits. In place of the compound represented by the above formula, there may be used compounds which are substituted by higher molecular alkyl groups instead of by the methyl groups, which higher alkyl groups may possess up to about 20 carbon atoms.

*Example 7*

Cyclohexanone is condensed with technical cresol in known manner and then hydrogenated, the resulting product being then esterified with a higher boiling portion of hardened whale oil fatty acids. Fifteen parts by weight of the ester obtained are thoroughly mixed with 7 parts by weight of ozocerite, 13 parts by weight of paraffin and 65 parts by weight of oil of turpentine. The resulting product possesses good polishing qualities and gives a very high gloss to surfaces to which the same is applied. It is of special value for the preservation of leather and may be used in the treatment of French polish, etched metals and other substances.

It should be understood that the present invention is not limited to the specific compounds and process steps hereinbefore disclosed, but that it includes all variations coming within the tenor of the specification and the scope of the terms of the appended claim.

We claim:

Polishing compositions of waxy character containing as the primary waxy component a monobasic carboxylic acid ester of a perhydrogenated novolak.

WINFRID HENTRICH.
CARL ALBERT LAINAU.

---

CERTIFICATE OF CORRECTION.

Patent No. 2,139,231. December 6, 1938.

WINFRID HENTRICH, ET AL.

It is hereby certified that error appears in the printed specification of the above numbered patent requiring correction as follows: Page 3, first column, line 59, for "CH" at the end of the formula read $CH_3$; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.